United States Patent [19]

Zimmer

[11] 4,368,351

[45] Jan. 11, 1983

[54] AMPLITUDE MODULATED DIGITIZER

[75] Inventor: Scott E. Zimmer, Fairfield, Conn.

[73] Assignee: Summagraphics Corporation, Fairfield, Conn.

[21] Appl. No.: 233,626

[22] Filed: Feb. 12, 1981

[51] Int. Cl.³ .......................................... G08C 21/00
[52] U.S. Cl. .................................................... 178/19
[58] Field of Search ........................... 178/18, 19, 20; 340/146.35 Y, 347 AD; 33/1 M; 346/139 C

[56] References Cited

U.S. PATENT DOCUMENTS

| | | | |
|---|---|---|---|
| 3,904,822 | 9/1975 | Kamm et al. ........................ | 178/19 |
| 4,080,515 | 3/1978 | Anderson ............................ | 178/19 |
| 4,088,842 | 5/1978 | Ikedo .................................. | 178/19 |
| 4,185,165 | 1/1980 | Fencl .................................. | 178/19 |
| 4,206,314 | 6/1980 | Prugh et al. ....................... | 178/19 |
| 4,243,843 | 1/1981 | Rocheleau ......................... | 178/19 |

Primary Examiner—Thomas A. Robinson
Attorney, Agent, or Firm—Daniel M. Rosen

[57] ABSTRACT

A digitizer having a pointer or cursor driven by an alternating carrier signal and a grid of sequentially enabled parallel spaced conductors inductively coupled to the cursor includes an AM demodulator for detecting the instantaneous time of change of phase of the signal induced in the grid. In a preferred embodiment of the invention, a multiplier is used as the demodulator.

4 Claims, 5 Drawing Figures

FIG. 4 is a graphical timing diagram of the signals of FIG. 3 with the pointer located at a second position.

FIG. 5 is a diagram showing the overlapping sections of conductors in the grid of the preferred embodiment of the invention.

DESCRIPTION OF THE PREFERRED EMBODIMENT

Referring now to FIG. 1 of the drawings, there is shown a digitizer, in accordance with the invention, which includes a movable pointer 2 which can be a cursor or stylus and which includes an excitation coil which induces electromagnetic signals into a two-dimensional grid 4. The grid 4 includes two transverse arrays of accurately, equally spaced parallel conductors 6x and 6y. The conductors 6x are spaced horizontally and run parallel in the vertical direction and the conductors 6y are spaced vertically and run horizontally in the view of FIG. 1. The conductors 6x are in close proximity to but do not make contact with the conductors 6y. The conductors for each of the coordinate directions, x and y, are terminated at one end in common return lines 8x and 8y respectively and at their opposite ends at respective inputs of an x axis switching network 10x with sixteen multiplexers $10x_{1-16}$ respectively and a y axis switching network 10y with multiplexers $10y_{1-16}$ respectively. The multiplexers $10x_{1-16}$ and $10y_{1-16}$ can be made from H1-506 integrated circuits manufactured by Harris Corporation. The network 10x connects the conductors 6x one at a time, in sequence, to a common output which is connected to the input of a demodulator circuit 12x and the network 10y connects the conductors 6y, one at a time, in sequence, to a common output which is connected to the input of a demodulator circuit 12y. The AM demodulators 12x and 12y can be of identical construction which will later be described with reference to FIG. 2.

A clock oscillator 14 generates a high, constant frequency signal which is applied to a divider 16. The lower frequency output of the divider 16 serves as a timing source for conductor multiplexing and generation of the AC drive signal that is applied to the coil of the pointer 2. The output of the divider 16 is applied to a cursor drive circuit 18 and serves as a timing source for the cursor drive circuit 18. The output of the cursor drive circuit 18 is an AC constant amplitude signal.

Referring to FIG. 3 of the drawings, there are shown signal timing diagrams for a situation wherein the edges of the coil of the cursor 2 are intermediate adjacent grid conductors 6 as illustrated in FIG. 3A. The timing source signals 3B are applied by the output of the divider 16 to the cursor drive circuit 18, the output of which is the AC constant amplitude cursor drive signal 3C. In FIG. 4 there are shown the timing source signal 4B and cursor drive signal 4C for the case wherein the cursor 2 is disposed with the edges of its coil directly over adjacent conductors 6 as illustrated in FIG. 4A. The timing source signals 3B and 4B are identical as are the cursor drive signals 3C and 4C. The cursor drive signals are also applied to respective inputs of the demodulators 12x and 12y through a phase shift reference circuit 20 which shifts the phase of the output of the cursor drive circuit 18 to compensate for the inherent phase shift between the cursor drive signal output of the cursor drive circuit 18 and the induced output signals which appear on the conductors 6x and 6y and are applied through the multiplexers of the networks 10x and 10y to the demodulators 12x and 12y. Hence the output signals from the phase shift reference circuit 20 are in phase or 180° out of phase with the x grid and y grid signals which are applied by the multiplexers $10x_{1-16}$ and $10y_{1-16}$ to the demodulators 12x and 12y respectively.

The cursor 2, and its coil which includes multiple turns of fine wire wound on a toroidal steel core, is excited by the sinusoidal current from the cursor drive circuit 18 and creates a magnetic field which is directed by the cursor core to penetrate downward into the plane of the grid 4 formed from the conductors 6x and 6y. This magnetic field couples with the conductors 6x and 6y thereby causing sinusoidal current to flow in the conductors as they are enabled by the respective multiplexers 10x and 10y as a result of induction between the coil of the pointer 2 and the conductors 6x and 6y. The magnetic field which is generated is perpendicular to the outer edge of the toroidal core of the cursor 2. Maximum induced current therefore occurs in conductors 6x and 6y which are adjacent to the outer edge of the cursor, and a minimal current flows in conductors which are directly under the center of the cursor due to the equal and opposite flux patterns acting on the conductor. In the case of a conductor directly beneath the center of the cursor, there is substantially no current flow. That is, the current in the conductor has a magnitude of zero.

The frequency of switching of conductors 6x and 6y on the grid 4 is identical to the frequency of the signal being driven into the grid from the cursor drive circuit 18. The time between switching of two adjacent conductors is therefore exactly equal to the time of one complete cycle of the sinusoidal cursor drive signal. Conductor switching is accomplished by the multiplexers $10x_{1-16}$ and $10y_{1-16}$ in response to output signals from an x axis multiplex decoder 22x, a y axis multiplex decoder 22y and a common line address counter 24. The x axis multiplexers $10x_{1-16}$ include 16 multiplexers each of which has a four bit input to control 16 adjacent conductor wires 6x. Similarly, the y axis multiplexers consist of 16 individual multiplexers each of which has a four bit input to control 16 adjacent conductors 6y. This arrangement permits the tablet to have an array of 256 conductors in each of the x and y directions. The conductors 6x and 6y are spaced 0.25 inches apart so that each multiplexer controls four inches of grid length with a total grid length of 64 inches in each dimension being permitted. By varying the size or number of multiplexers and the spacing of the conductors, various grid sizes can be accommodated as will be appreciated from the teachings of the invention.

The x axis multiplexer decoder 22x determines which of the 16 x axis multiplexers is enabled at any given time according to its four bit binary output which is able to provide 16 digital output signal combinations. In order for one of the conductors 6x to be enabled for conducting an induced current, the multiplexer which controls it must be enabled and the output count of the line address counter 24 must generate at its output, a four bit digital signal corresponding to the address of the conductor relative to the enabled multiplexer. Conductors 6y are enabled in a manner similar to that by which the conductors 6x are enabled with y axis multiplexer enabling being governed by the output of the y axis decoder 22y. The individual conductor addresses within multiplexers are generated by the line address counter 24 simultaneously for the conductors 6x and 6y. The line address counter 24 receives the timing output sig-

AMPLITUDE MODULATED DIGITIZER

BACKGROUND OF THE INVENTION

This invention concerns apparatus for determining the position of a pointer with respect to the surface of a tablet, such apparatus commonly being referred to as a digitizer. More specifically, this invention concerns digitizers wherein parallel conductors arrayed in a grid across a coordinate dimension are sequentially enabled to permit electrical induction to take place between the enabled conductor and a coil in the pointer, for producing a signal having a characteristic which can be detected when the conductor or conductors in nearest proximity to the pointer are enabled for stopping a clock or timer started at the enabling of a grid conductor corresponding to an origin, to determine a coordinate of the pointer position which is proportional to the elapsed time measured by the timer.

It is known in the art of digitizers to drive a grid of sequentially enabled conductors with a signal which is induced in a pointer, while continually monitoring the signal induced in the pointer, to detect a change in amplitude or phase indicative of the passing of the grid energizing signals swept along the conductors beneath the pointer. It is also known to energize the pointer coil and to monitor the output signals induced in sequentially energized grid conductors.

U.S. Pat. No. 4,088,842 to Ikedo for an Automatic Coordinate Determining Device discloses a digitizer, having a grid of scanned parallel sequential conductors, which depends on magnitude sensing to determine the coordinates of a pointer. It has also been found that highly accurate pointer determination is possible in a digitizer employing a scanned grid by detecting the change in phase of the voltage induced in the pointer or grid, depending on which of the pointer and grid is driven with an AC signal, as the scanning signal which enables the grid wires passes beneath the pointer. Examples of digitizer systems which depend on phase change detection to stop a counter or timer, started at the commencement of grid scanning by grid conductor enabling, are disclosed in U.S. Pat. No. 3,904,822 to Kamm et al. for an Absolute Position Determining System Using Free Stylus, U.S. Pat. No. 4,080,515 to Anderson for Successively Electromagnetically Scanned X-Y Grid Conductors with a Digitizing System Utilizing a Free Cursor or Stylus, and U.S. Pat. No. 4,243,843, assigned to the assignee of the present invention by Rocheleau for a Coarse Position Digitizer. The foregoing patents disclose digitizer systems wherein the detection of a time of change of phase of the induced signal is performed by complex equipment requiring extensive use of digital circuitry and the processing of numerous signals, some of which must be derived by analog to digital conversion.

The above mentioned prior art phase detection digitizers are also limited with respect to the number of coordinate measurements which can be made over a period of time as the rate of grid scanning, that is, the rate at which the grid conductors are enabled is limited by the frequency of the grid scanning signal. The longer the tablet, the greater is the number of needed grid conductors and the longer is the time required to scan its full length in each dimension. The aforementioned Ikedo patent discusses provision for storing the address of the pointer and limiting future scans to an area less than the full dimension of the tablet.

SUMMARY OF THE INVENTION

The present invention overcomes the aforementioned problems of prior art digitizers in providing a digitizer having a grid of sequentially scanned conductors inductively coupled to a pointer movable over the surface of the grid, wherein the signal induced in one of the pointer and grid by energization of the other of the pointer and grid is amplitude modulated as a result of the conductor scanning and then detected by amplitude demodulation to determine the zero amplitude crossing point of the envelope of the AM signal that is coincident with the change in phase of the signal. Amplitude modulated signals are produced as a result of excitement by a constant amplitude signal induced by the energization and the switching of adjacent conductors of different displacements relative to the excitation source. Different conductor-pointer displacements result in correspondingly different magnitudes of the excitation signal being induced in the respective conductors. Synchronous switching or multiplexing of adjacent conductors carrying different magnitudes of the induced signal produces the amplitude modulated signal.

The grid is divided into sub-sections each of which is associated with a separate group of multiplexers for controlling sequential scanning of the conductors within the sub-section. Following the detection of a phase change by sensing the zero crossing of the AM induced signal the next grid scan is commenced in the sub-section including the last determined pointer position coordinate. A coordinate measurement counter is incremented by an amount corresponding to the cumulative dimension of the sub-sections intermediate the origin and the sub-section in which scanning is commenced. In the absence of detection of the AM induced signal zero crossing within the grid sub-section in which scanning is commenced, subsequent sub-sections are scanned. If no zero crossing point is detected during scanning of the subsequent sub-sections, the counter is reset to zero and scanning again begins from the origin.

It is therefore an object of the invention to provide a digitizer wherein an amplitude modulated signal is induced in one of a pointer and grid by an AC signal applied to the other of the pointer and grid and wherein the change of phase of the induced signal can be detected by AM demodulation.

Another object of the invention is to provide a digitizer wherein the change of phase of the amplitude modulated signal can be detected by determining the time at which the product of the induced and excitation signals changes polarity.

Other and further objects of the invention will be apparent from the following drawings and description of a preferred embodiment of the invention in which like reference numerals are used to indicate like parts in the various views.

Figure 1:
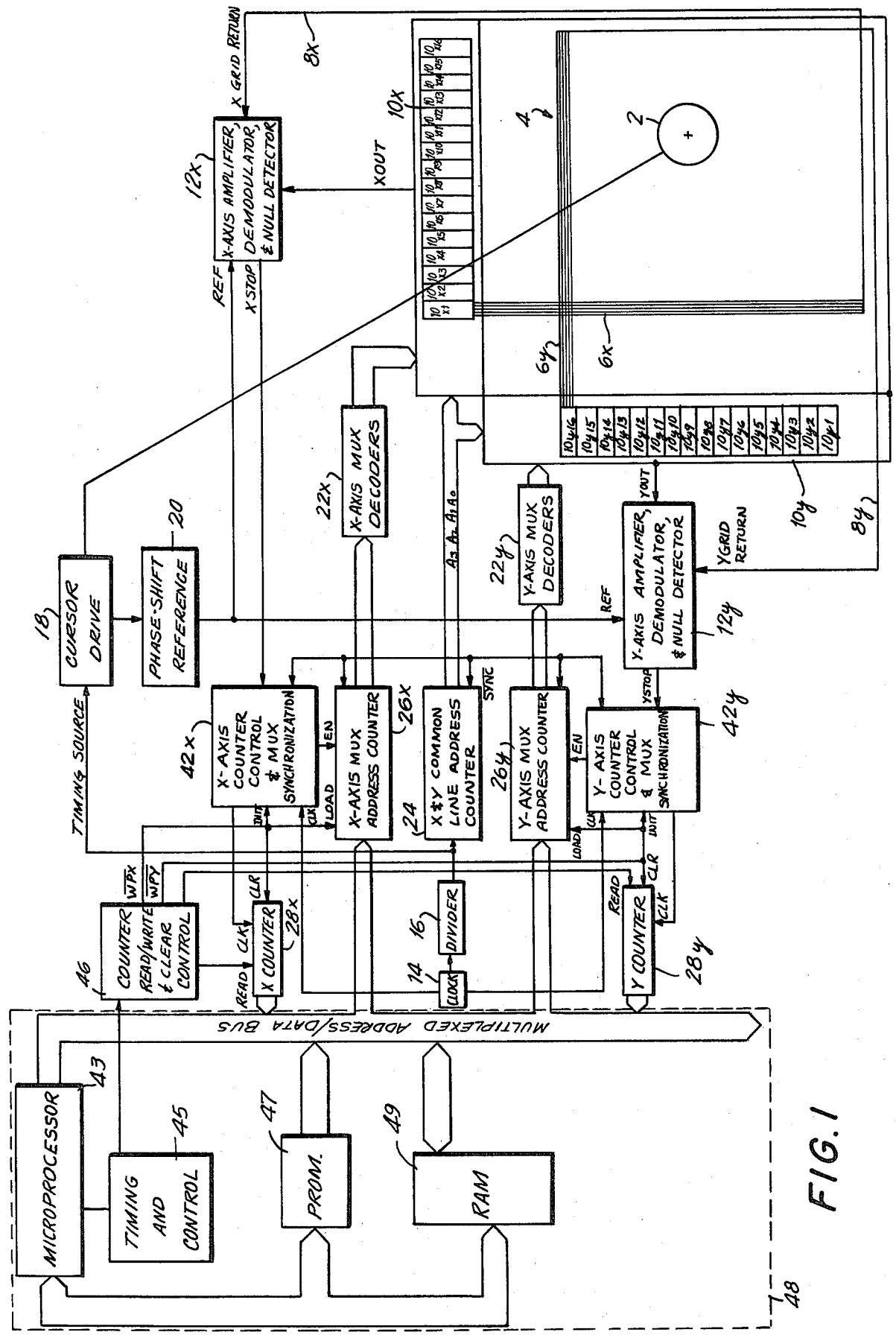
FIG. 1 is a schematic block diagram of the apparatus of the preferred embodiment of the invention.

the first multiplexer of each of the overlapping sections. The first of the overlapping sections in the x coordinate direction includes those conductors 6x controlled by multiplexers $10x_1$ through $10x_8$. The second section consists of those conductors 6x controlled by multiplexers $10x_5$ through $10x_{12}$. The third of the subsections in the x coordinate direction consists of those conductors 6x controlled by multiplexers $10x_9$ through $10x_{16}$.

To begin initial scanning of the grid 4, a counter read-write and clear control circuit 46, under the control of the microprocessor system 48 which includes a microprocessor central unit 43, a timing and control section 45, a programmable read only memory (PROM) 47 and a random access memory (RAM) 49, generates the x and y write signals WP which are herein referred to as WPx and WPy respectively. The write pulses load the address of the first multiplexer $10x_1$ of the x axis multiplexers $10x_{1-16}$ and y axis multiplexers $10y_1$ of the y axis multiplexers $10y_{1-16}$ respectively into the x axis multiplex counter 26x and y axis multiplex counter 26y respectively. The write pulses WPx and WPy simultaneously clear the x counter 28x and the y counter 28y. If the presence of the cursor is not detected by a change of phase of the voltage induced in the grid upon completion of the scanning of the first section which is controlled by the first eight multiplexers, e.g., $10x_{1-8}$, an overflow condition in the counters in the control and synchronization circuit 42x is transmitted to the microprocessor system 48. The y conductors are similarly scanned and if the presence of the cursor is not detected by a change of phase of the voltage induced in the grid upon completion of scanning of the first section of the grid which is controlled by the first eight of the multiplexers $10y_{1-16}$, i.e., $10y_{1-8}$, an overflow condition in the counters in the control and synchronization circuit 42y is transmitted to the microprocessor system 48.

In response to the overflow signal from the control circuits 42x and 42y, the microprocessor system 48 generates another write pulse WPx, or WPy, or WPx and WPy depending on whether the overflow condition is generated in the x counter control circuit 42x or the y counter control circuit 42y or both. The write pulse clears the counter control circuit 42x and 42y and loads the respective multiplex selector counter 26x and 26y with the address of the first multiplexer controlling the next section to be scanned, i.e., multiplexer $10x_5$ or $10y_5$. The second of the overlapping sections controlled by multiplexers $10x_{5-12}$ or $10y_{5-12}$ are then scanned in sequence beginning with the conductors controlled by multiplexer $10x_5$ and continuing with the conductors controlled by multiplexer $10x_6$, $10x_7$ . . . or $10y_6$, $10y_7$ . . . until a detected change of phase of the induced signal indicates the presence of the cursor 2. If the cursor 2 is not detected after scanning of the conductors controlled by multiplexer $10x_{12}$ or $10y_{12}$, again an overflow condition results in the counters in the control and synchronization circuits 42x or 42y which is transmitted to the microprocessor system 48. In response to the overflow signal, the microprocessor generates another write pulse WPx, or WPy, or WPx and WPy, depending on whether the overflow condition is generated in the x counter control circuit 42x or the y counter control circuit 42y or both. The write pulse again clears the counter and control circuit 42x or 42y and the respective multiplexer address counter 26x or 26y is loaded with the address of the first multiplexer in the next section to be scanned, i.e., multiplexer $10x_9$ or $10y_9$. The conductors 6x or 6y controlled by multiplexer $10x_9$ and/or $10y_9$ are then sequentially scanned and if the presence of the cursor is not sensed by detection of a change of phase, the conductors controlled by multiplexers $10x_{10}$, $10x_{11}$, $10x_{12}$ . . . or $10y_{10}$, $10y_{11}$, $10y_{12}$ . . . are sequentially scanned until the cursor presence is detected. If all sixteen of the conductors controlled by multiplexer $10x_{16}$ are scanned without detection of the cursor, as may occur if the cursor is removed from the tablet, scanning again resumes with the first multiplexer $10x_1$ of the first of the overlapping sections. The same occurs with the y conductors 6y and y multiplexers $10y_{1-16}$, depending upon the position of the cursor.

Figure 5:
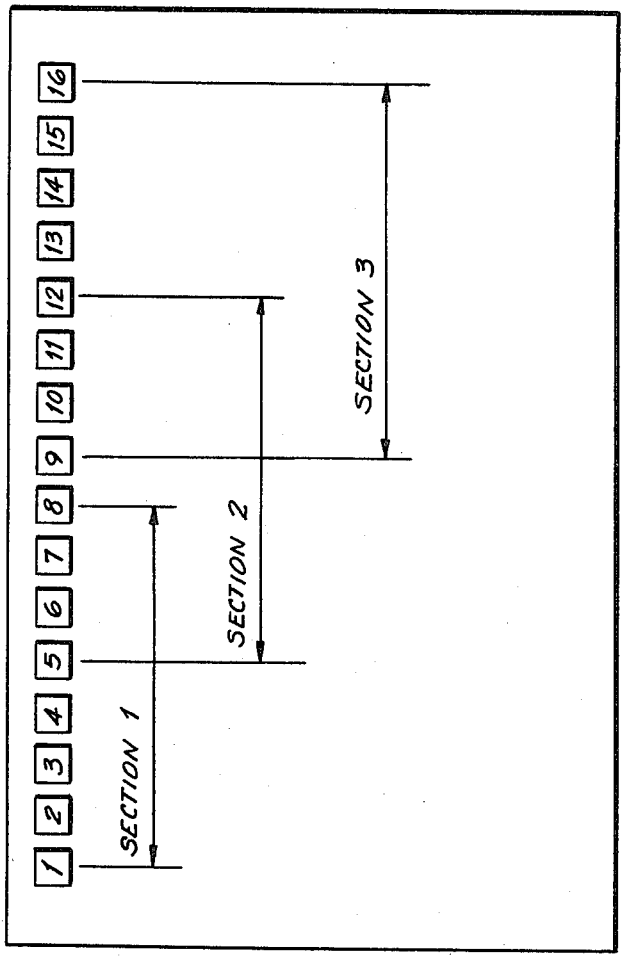

Each time a new section is scanned, a magnitude corresponding to the distance from the origin axis, i.e., the first conductor 6x or 6y in the first multiplexer $10x_1$ or $10y_1$, to the first conductor in the next section to be scanned, i.e., the first conductor 6x controlled by the multiplexer $10x_5$ or the first conductor 6y controlled by the multiplexer $10y_5$ is added to an accumulator in the microprocessor 48. The same magnitude is again added to the accumulator in the random access memory (RAM) 49 of the microprocessor system 48 if during the scan of the second section the presence of the cursor 2 is not detected. Upon failure to detect the cursor in the third section (multiplexers $10x_{9-16}$ or $10y_{9-16}$) the accumulator in the microprocessor system 48 is reset to 0 and scanning again begins in the first section. The overlapping sections are illustrated in FIG. 5 of the drawings.

Once the location of the cursor 2 has been determined by detection of a phase change in the grid output signal, the system enters the second mode of operation in which subsequent scans begin with the first conductor 6x or 6y of the multiplexer four removed from the multiplexer controlling the conductor 6x or 6y which was last scanned prior to the detection of a change of phase in the grid output signal. If during scanning of the x conductors 6x a change of phase in the grid output signal is detected following the scanning of the 98th conductor from the origin which is controlled by multiplexer $10x_7$, the next scan begins with the first conductor 6x controlled by multiplexer $10x_3$. As the following scan begins, the accumulator in the microprocessor system 48 is incremented by a magnitude corresponding to the distance from the origin conductor 6x to the conductor 6x at which the scan is begun. Each time the grid output signal changes phase and the cursor 2 is thereby detected, subsequent scans begin at the first conductor controlled by the multiplexer four removed from the multiplexer controlling the last scanned conductor prior to cursor detection. The count in the accumulator of the microprocessor system 48 is cleared and then incremented with a magnitude equal to the distance from the origin conductor to the conductor at which the scan is initiated. In the event that the presence of the conductor is not detected by a change of phase signal after scanning of the eighty conductors controlled by the four multiplexers (e.g. $10x_{3-6}$) prior to the multiplexer controlling the conductor last scanned before detection of the change of phase in the grid output signal, and the conductors controlled by the last scanned multiplexer (e.g. $10x_7$), the system reverts to the mode of scanning overlapping sections previously described, the accumulator in the microprocessor system 48 is cleared, and scanning begins at the origin conductor.

In the configuration of the preferred embodiment of the invention, the conductor spacing is 0.25 inches and nals from the divider 16 which are also applied to the cursor drive circuit 18 so that the frequency of switching of conductors on the grid is identical to the frequency of the signal being applied to the grid inductively by the cursor 2.

The x axis multiplex decoder 22x and y axis multiplex decoder 22y receive count signals from an x axis multiplex address counter 22x and a y axis multiplex address counter 26y respectively. The x axis and y axis multiplex address counters 26x and 26y are conventional counters which are clocked by an output of the common line address counter 24 so that each of the x and y axis multiplex address counters 26x and 26y are incremented once with every 16 counts of the line address counter 24.

The output signals of the common line address counter 24 can be seen on a time scale in FIGS. 3D and 4D which shows the four bit digital output signal. As can be seen from a comparison of FIGS. 3C and D and from FIGS. 4C and D, the frequency of the line address counter 24 corresponds to the frequency of the cursor drive signal.

As the line address counter 24 sequentially counts in response to the timing signal output of the clock 14 and divider 16, adjacent conductors 6x and 6y are successively enabled one at a time. With the enabling of each of the conductors 6x and 6y, a full cycle of the alternating signal applied to the cursor 2 by the cursor drive circuit 18 is induced in the enabled conductor 6x and 6y and conducted to the input of the respective demodulator circuit 12x and 12y. The amplitude of the cycle of the alternating signal induced in each of the successively enabled conductors 6x and 6y is very small, and may approach zero in the case of conductors distant from the cursor 2. The amplitude of the cycle increases with proximity to the cursor 2 until a maximum is reached with the conductors adjacent the circumference of the circular cursor coil. The amplitude decreases beneath the cursor coil as the position of the enabled conductor approaches the center of the cursor then increases again to a maximum at the diametrically opposite point on the circumference. The phase of the signal induced in enabled conductors on one side of the center of the cursor is opposite to the phase of the signals induced on the other side of the center of the cursor.

The resulting signal which appears at the multiplexer outputs is a continuous, sinusoidal time varying, constant frequency, amplitude modulated signal exhibiting phase reversal between the two maximum amplitudes. The phase reversal occurs in time relative to conductor positions with respect to the cursor center. The exact moment of phase reversal cannot be accurately detected directly from the AM output signal alone. However, using the cursor drive excitation signal as a reference, the envelope defined by the amplitude-modulated grid signal can be developed. The point where the envelope passes through the zero point on the amplitude axis corresponds to the grid position where the phase reversal has occurred. The occurrence of the envelope zero-crossing is used to generate an index signal to stop a counter 28x for the output from the x multiplexers 10x and to stop a counter 28y for the output from the multiplexers 10y as will subsequently be explained. The x and y counters 28x and 28y respectively are started upon the enabling of first or reference ones of conductors 6x and 6y respectively and the orthogonal distances of the center of the pointer 2 from the reference conductors, (which coincide with the coordinate axes), are proportional to the number of counts stored in the counters 28x and 28y respectively.

Figure 2:
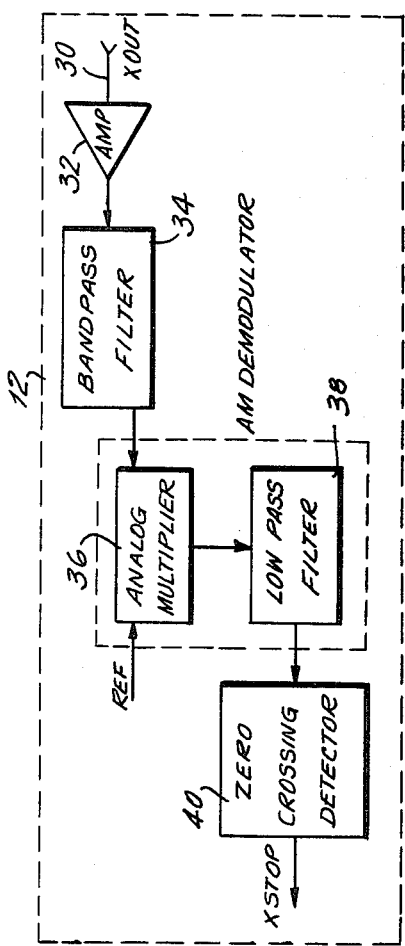
FIG. 2 is a block diagram of an AM demodulator suitable for use with the apparatus illustrated in FIG. 1.

Referring now to FIG. 2 of the drawing there is shown an AM demodulator 12 suitable for use as the x axis demodulator 12x or the y axis demodulator 12y. The inputs of the demodulator 12 which are adapted to be connected to the x multiplexer 10x outputs and grid return line 8x or the y multiplexer 10y outputs and grid return line 8y are connected to the inputs 30 of an amplifier 32. The output of the amplifier 32 is connected to a band pass filter 34 which screens out spurious signals outside of the frequency range of the amplitude modulated AC signal induced in the conductors 6x and 6y. The output of the band pass filter 34 is connected to one input of an analog multiplier 36 which can be an XR-2208 Operational Multiplier. Another input of the analog multiplier 36 is connected to receive the AC reference signal output of the phase shift circuit 20. The output of the analog multiplier 36, which has an amplitude varying with the product of the amplitudes of the output signal of the band pass filter 34 and the amplitude of the output signal of the phase shift circuit 20, is applied to a low pass filter 38 where high frequency harmonic components of the induced signal are removed. The output of the low pass filter 38 is applied to a zero crossing detector 40 to generate a digital stop or index signal corresponding to the time of zero crossing of the envelope of the AC signal induced in the grid.

Figure 3:
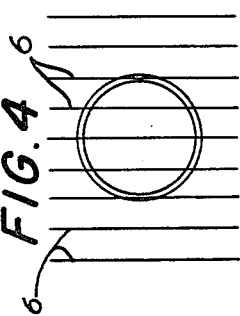
FIG. 3 is a graphical timing diagram illustrating the relationship of signals developed in the apparatus of the preferred embodiment of the invention with the pointer positioned at a first position.
Figure 3:
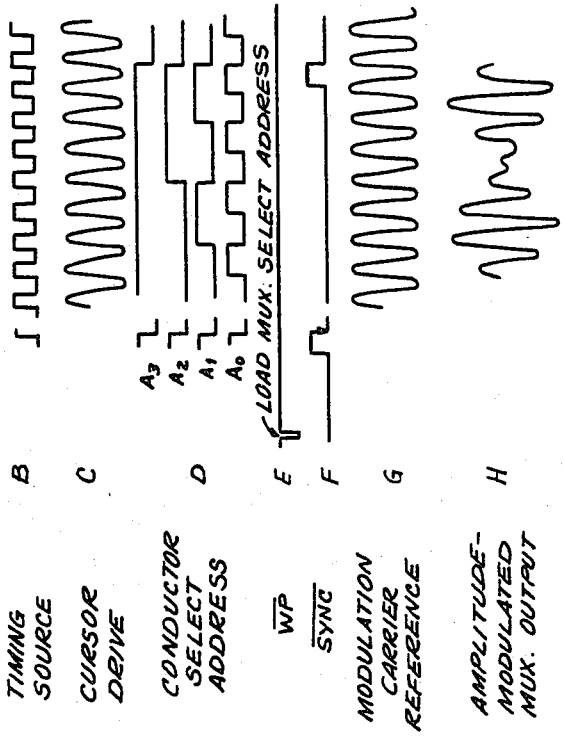
Figure 3:
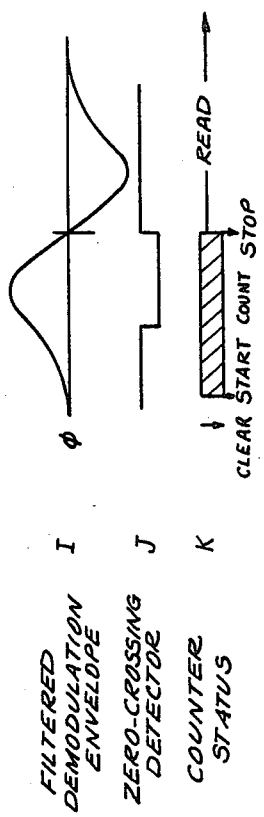
Figure 4:
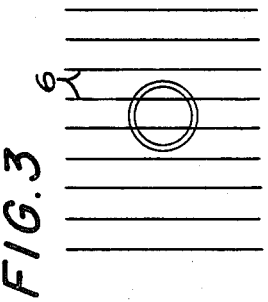
Figure 4:
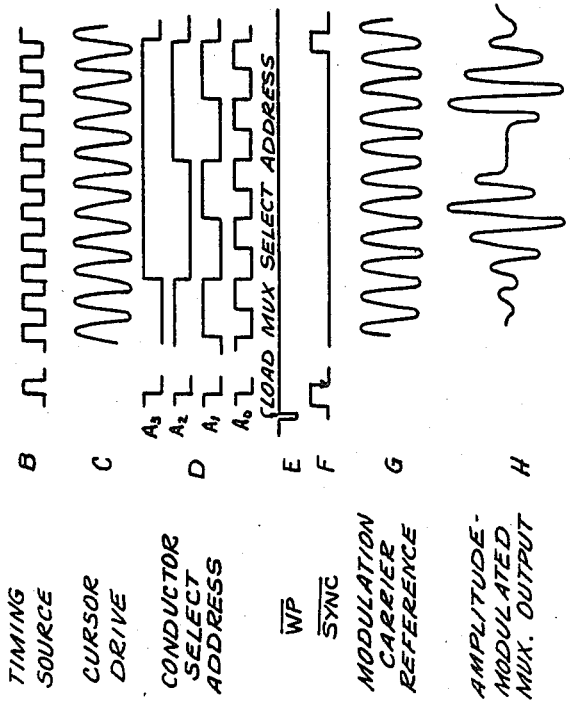
Figure 4:
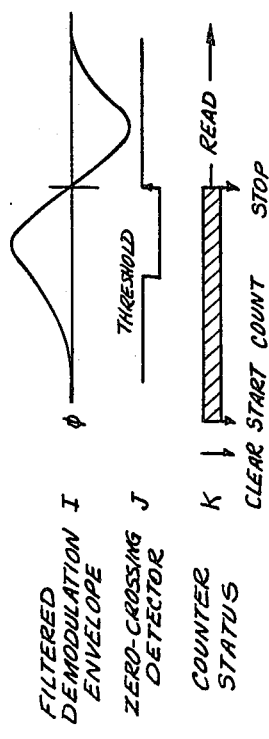

Referring to FIGS. 3 and 4 of the drawings, write pulses WP which initiate grid scanning are shown in FIGS. 3E and 4E. The write pulses WP simultaneously clear the x and y data counters 28x and 28y, set up their respective counter control flip-flop circuitry and load the multiplexer address counters 26x and 26y to select the first multiplexer $10x_1$ and $10y_1$ from the multiplexers $10x_{1-16}$ and $10y_{1-16}$ on the x axis and y axis respectively, that is, the x and y multiplexers which enable conductors 6x and 6y corresponding to the x and y axes. When the conductor select address lines all go low, that is when the sum of the outputs of the common line address counter 24 is 0000, indicating the enabling of the first conductor on any given activated multiplexer, a SYNC pulse output from the common line address counter 24 starts the data counters 28x and 28y and enables the multiplexer select counters 26x and 26y to increment on subsequent SYNC pulses. The timing of the SYNC pulses in relation to the conductor select address signal output of the common line address counter 24 is shown in FIGS. 3F and 4F.

The output signals from the zero crossing detector 40 of each of the demodulators 12x and 12y are applied respectively to an x axis counter control and multiplex synchronization circuit 42x and to a y axis counter control and multiplexer synchronization circuit 42y. The x and y axis counter control circuits 42x and 42y permit the scanning of the grid to be limited to sub-sections smaller in area than the entire grid in order to increase the rate of cursor coordinate measurements. The use of an audio frequency cursor excitation signal, e.g., 9.9 KHz in the preferred embodiment of the invention, tends to reduce noise problems from external sources such as radio frequency interference. However, scanning the entire length of a 64 inch axis takes up to 24 milliseconds, which limits the coordinate rate to only 40 measurements per second.

In order to increase the rate of measurement, the grid can be divided into three overlapping sections in each coordinate direction with a different multiplexer being the cursor diameter is approximately 1 inch. Sixteen input multiplexers are used for conductor switching and require four address inputs to select any one of the sixteen conductors per multiplexer. Each multiplexer services four inches of grid area. Four counter-driven conductor select address lines from the line counter 24 are common to all of the multiplexers on both axes and successively enable conductors common to any activated multiplexer. Both multiplexer axis arrays have separate loadable address counters 26x and 26y, the four outputs of which are decoded at the grid by the decoders 22x and 22y to activate any one of up to sixteen multiplexers per axis. The multiplexer select counters 26x and 26y are clocked from the output of the x and y common line address counter 24, assuring a synchronous and sequential scanning of conductors along both axes. The frequency of conductor switching and cursor drive is derived synchronously from the crystal oscillator 14 which also serves as the clock for the x axis and y axis counters 28x and 28y which supply the position coordinate data.

As the scan progresses along each dimension of the grid 4, signals induced by the cursor 2 in each axis are amplified and filtered to allow only the cursor drive frequency to pass through for demodulation. The modulation carrier reference signal is shown in FIGS. 3G and 4G and the corresponding amplitude modulated multiplexer output signals are shown in FIGS. 3H and 4H respectively. The amplitude modulated signals of FIGS. 3H and 4H are mixed with the unmodulated carrier reference signal shown in FIGS. 3G and 4G respectively to generate the envelopes of the respective amplitude modulated output signals. For demodulation each analog multiplier 36 is used as a phase comparator and detector. The output of the multiplier is applied to the low pass filter 38. The average value of the filtered multiplier output product is proportional to the sine of the phase angle between the two inputs to the multiplier 36. If the phase angle between the two inputs is small, a linear output is produced, since the sine is approximately equal to the angle for small angles. A positive output is produced if the signal is in phase with the reference and the output is negative if the signal is 180° out of phase. The envelope of the amplitude modulated multiplexer output derived by demodulation is shown in FIGS. 3I and 4I for the corresponding cursor positions shown in FIGS. 3A and 4A respectively.

The reference signal of FIGS. 3G and 4G is used as an attenuated version of the cursor drive carrier signal whose phase has been shifted so as to lock to the AM grid signal.

The multiplier input reference is therefore either completely in phase or completely out of phase with the constant frequency grid output, insuring linear demodulation within the multiplier 36. The low pass filter 38 eliminates any double-frequency components generated by the multiplier, and assures a linear slope of the envelope between the positive and negative peaks as it passes through zero as can be seen in FIGS. 3I and 4I.

Each axis demodulated signal is applied to a comparator which serves as the zero crossing detector 40 to stop the respective data counter 28x and 28y when the zero crossing is detected, via the counter control circuits 42x and 42y. The output of the zero crossing detector is shown in FIGS. 3J and 4J. The number of counts left in each of the counters 28x and 28y is proportional to the ratio of the counter clock frequency, which in the preferred embodiment of the invention is 10.1376 MHz and the conductor switching frequency which in the preferred embodiment of the invention is 9.9 KHz. The number of counts per inch of axis scanned is therefore 4096([10.1376 MHz/9.9 KHz]/0.250").

Stop signals from the control logic circuits 42x and 42y are applied to the microprocessor system 48 which can employ an Intel 8085A microprocessor. The outputs of the control circuits 42x and 42y are polled periodically to provide counter status information. Once either of the counters 28x and 28y is stopped, its contents are read by the microprocessor system 48 and temporarily stored within the random access memory 49 in the microprocessor system 48 which serves as the accumulator. The counter status is graphically shown in FIGS. 3K and 4K. The two last significant counter bits are dropped, and the remaining bits are shifted to provide a resolution of 1024 counts per inch. This count is further scaled by the microprocessor to 1,000 per inch. Each count, therefore, represents 0.001 inch of cursor movement from the origin reference in each coordinate direction. The microprocessor system 48 then formats the output counts for display by means known to those skilled in the art.

It is to be appreciated that the foregoing description is of a preferred embodiment of the invention to which alterations and variations may be made without departing from the spirit and scope of the invention which is defined in the following claims.

What is claimed is:

1. In a digitizer having a pointer inductively coupled to a grid of a plurality of elements, means for energizing one of said grid and pointer with an alternating signal, means for sequentially enabling said elements, means for detecting a change in phase of the signal induced in the other of said pointer and grid in response to said alternating signal, and a counter responsive to said phase change detecting means for recording a count proportional to the time between the start of said sequential enabling of said elements and said phase change detection, the improvement wherein said detecting means comprises an envelope detector having a first input operatively connected to said other of said pointer and grid to receive said induced signal, a second input operatively connected to said energizing means to receive a reference signal having a frequency equal to the frequency of said alternating signal, means multiplying the signals at said two inputs to produce an output having a waveform with an envelope with one polarity when said alternating signal and induced signal are in phase and an opposite polarity when said alternating and induced signals are out of phase, whereby said waveform changes polarities substantially at the time of change of phase of said induced signal, and a zero crossing detector for detecting the time at which the polarity of said waveform changes, to control the count in said counter.

2. Apparatus according to claim 1 further comprising a filter operatively connected between the output of said multiplier means and the zero crossing detector.

3. Apparatus according to claim 2 wherein said filter blocks high frequency components of said multiplier means output signal while passing lower frequency components of said multiplier means output signal.

4. Apparatus according to claim 1 wherein said zero crossing detector has an output at which there is generated an index signal in response to the change in polarity of said waveform envelope, and further comprising
a timer responsive to said index signal for producing a signal having a magnitude related to the position of said pointer with respect to said grid.

* * * * *

UNITED STATES PATENT AND TRADEMARK OFFICE
CERTIFICATE OF CORRECTION

PATENT NO. : 4,368,351
DATED : January 11, 1983
INVENTOR(S) : Scott E. zimmer

It is certified that error appears in the above—identified patent and that said Letters Patent is hereby corrected as shown below:

Col. 5, line 8, delete "28x" and insert -- 26x --.

Signed and Sealed this

Thirteenth Day of December 1983

[SEAL]

Attest:

GERALD J. MOSSINGHOFF

Attesting Officer

Commissioner of Patents and Trademarks